United States Patent [19]
Kumada

[11] Patent Number: 5,473,288
[45] Date of Patent: Dec. 5, 1995

[54] OSCILLATION CIRCUIT

[75] Inventor: Akira Kumada, Nagaokakyo, Japan

[73] Assignee: Murata Manufacturing Co., Ltd., Nagaokakyo, Japan

[21] Appl. No.: 365,405

[22] Filed: Dec. 28, 1994

[30] Foreign Application Priority Data

Dec. 28, 1993 [JP] Japan ................... 5-353615

[51] Int. Cl.⁶ .............. H03B 5/04; H03B 5/36; H03K 3/011; H03L 1/02
[52] U.S. Cl. ............ 331/116 R; 331/65; 331/158; 331/176; 310/316; 73/504.12
[58] Field of Search .................... 331/65, 116 R, 331/116 FE, 116 M, 154, 155, 156, 158, 175, 176; 310/314–319; 73/505

[56] References Cited

U.S. PATENT DOCUMENTS

| | | | |
|---|---|---|---|
| 3,577,099 | 5/1971 | Hall et al. | 331/116 R X |
| 4,283,691 | 8/1981 | Burgoon | 331/116 R |
| 5,220,833 | 6/1993 | Nahamura | 73/505 |
| 5,345,822 | 9/1994 | Nakamura et al. | 73/505 |
| 5,349,261 | 9/1994 | Fujimoto et al. | 310/321 |
| 5,349,857 | 9/1994 | Kasanami et al. | 310/316 X |
| 5,355,034 | 10/1994 | Nakamura et al. | 307/491 |
| 5,412,204 | 5/1995 | Nakamura | 250/231.12 |
| 5,414,320 | 5/1995 | Mashio | 310/311 |

*Primary Examiner*—David Mis
*Attorney, Agent, or Firm*—Nikaido, Marmelstein, Murray & Oram

[57] ABSTRACT

The oscillation circuit 30 has the two input terminals 32a and 32b connected to the piezoelectric elements 3a and 3b of vibrator 1. These input terminals 32a and 32b are connected to the two input terminals of the adder 36 via the buffers 34a and 34b. The output terminal of the adder 36 is connected to the inversion input terminal of the operational amplifier 44 used as a comparator and the input terminal of the control signal generator 46. The output terminal of the operational amplifier 44 is connected to the collector of the transistor 62 and the output terminal of the control signal generator 46 is connected to the base of the transistor 62. The emitter of the transistor 62 is connected to the output terminal 80 via the phase-shifting circuit 70. The output terminal 80 of the oscillation circuit 30 is connected to the piezoelectric element 3c of the vibrator 1.

12 Claims, 4 Drawing Sheets

OSCILLATION CIRCUIT

BACKGROUND OF THE INVENTION

1. Field of the Invention

The present invention is related to an oscillation circuit, particularly to an oscillation circuit for generating a driving signal which drives a vibrator, by using the signal obtained from the vibrator, that is used for a vibrating gyroscope which can detect a rotational angular velocity.

2. Description of the Prior Art

The vibrator 1 includes a regular triangular prism-shaped vibrating body 2, and on three side faces of the vibrating body 2, piezoelectric elements 3a, 3b and 3c are formed respectively. Each of the piezoelectric elements 3a, 3b and 3c has a piezoelectric layer, and electrodes are formed respectively on both surfaces of the piezoelectric layers. One of the electrodes is bonded to a side of the vibrating body 2 and the other is used for signal input/output. In the vibrator 1, when similar driving signals are applied to the two piezoelectric elements 3a and 3b or it is applied to the piezoelectric element 3c, the vibrating body 2 bends and vibrates in perpendicular direction to a main surface of the piezoelectric element 3c. When the vibrator 1 is not rotating, similar signals can be detected from the piezoelectric elements 3a and 3b. When a rotational angular velocity is applied to the vibrator 1 around a central axis of the vibrating body 2, the bending and vibrating direction of the vibrating body 2 is changed by a Corioli's force and signals in proportion to the rotational angular velocity are detected from the two piezoelectric elements 3a and 3b. In this case, for example, a signal with larger level is detected from the piezoelectric element 3a and that with smaller level is detected from the other piezoelectric element 3b in response to the rotational angular velocity.

When using the vibrator 1 for the vibrating gyroscope, (1) the piezoelectric element 3c is connected to an input terminal of an oscillation circuit and an output terminal of the oscillation circuit is connected to the two piezoelectric elements 3a and 3b, (2) the two piezoelectric elements 3a and 3b are connected to the input terminal of the oscillation circuit and the output terminal of the oscillation circuit is connected to the piezoelectric element 3c, or (3) the piezoelectric element 3a or 3b is connected to the input terminal of the oscillation circuit and the output terminal of the oscillation circuit is connected to the piezoelectric element 3c in order to apply the driving signal to the vibrator 1. Further, the two piezoelectric elements 3a and 3b are connected to an inversion input terminal and a non-inversion input terminal of a differential amplifier circuit to detect the rotational angular velocity by a difference between detected signals from the two piezoelectric elements 3a and 3b.

FIG. 5 is a circuit diagram showing the conventional oscillation circuit for applying a driving signal to the vibrator 1 shown in FIG. 4. The oscillation circuit 10 has the input terminal 11 which is connected to the piezoelectric element 3c of the vibrator 1. The piezoelectric element 3c is grounded via a resistor 4c. The input terminal 11 is connected to an input terminal of an automatic gain control circuit 13 via a buffer 12 made of an operational amplifier. The automatic gain control circuit 13 consists of an operational amplifier 14, a resistor 15 for negative feedback, and a FET 16 as a variable impedance element; and its gain is reduced as the impedance between tile drain and the source of the FET 16 increases. Further, the output terminal of the buffer 12 is connected to the gate of the FET 16 incorporated in the automatic gain control circuit 13 via a control signal generator 17. The control signal generator 17 generates a control signal based on a difference between (1) the reference voltage $V_{ref}$ of a reference power supply 18 and (2) the signal which appears at the output terminal of the buffer 12, that is, the signal from the piezoelectric element 3c. Moreover, the output terminal of the automatic gain control circuit 13 is connected to the output terminal 20 via a phase-shifting circuit 19. The output terminal 20 is connected to the piezoelectric elements 3a and 3b via the resistors 4a and 4b, respectively.

In the oscillation circuit 10 shown in FIG. 5, the signal obtained from the piezoelectric element 3c of the vibrator 1 is applied to the piezoelectric elements 3a and 3b as the driving signal via the buffer 12 and automatic gain control circuit 13. When an amplitude of the signal obtained from the piezoelectric element 3c increases because an amplitude of the driving signal applied to the piezoelectric elements 3a and 3b increases, the voltage level of the control signal supplied to the gate of the FET 16 of the automatic gain control circuit 13 by the control signal generator 17 is decreased. Therefore, the impedance between the drain and the source of the FET 16 increases, the gain of the automatic gain control circuit 13 decreases, and so the amplitude of the driving signal applied to the piezoelectric elements 3a and 3b decreases. In reverse to this, when the amplitude of the signal obtained from the piezoelectric element 3c decreases because the amplitude of the driving signal applied to the piezoelectric elements 3a and 3b decreases, the voltage level of the control signal supplied to the gate of the FET 16 of the automatic gain control circuit 13 by the control signal generator 17 is increased. Therefore, the impedance between the drain and the source of the FET 16 decreases, the gain of the automatic gain control circuit 13 increases, and so the amplitude of the driving signal applied to the piezoelectric elements 3a and 3b increases. Consequently, in this oscillation circuit 10, it can be expected that a stable driving signal be applied to the piezoelectric elements 3a and 3b of the vibrator 1. Thus, when the stable driving signal is applied to the piezoelectric elements 3a and 3b of the vibrator 1, the variation of a sensitivity for detecting the rotational angular velocity is suppressed in the vibrating gyroscope in which the vibrator 1 is employed.

However, the voltage level applied between the drain and the source of the FET 16 used as a variable impedance element must be kept low in the oscillation circuit 10 shown in FIG. 5 in order to secure the linearity of the output signal to the input signal of the automatic gain control circuit 13. It is desirable that the voltage level be less than 100 mV, though it depends on the FET employed. Consequently, in order to cope with a large input signal for the automatic gain control circuit 13 and to attain a wide range in the gain of the automatic gain control circuit 13, the resistance value of the negative feedback resistor 15 must be great to obtain a high gain in the automatic gain control circuit 13; this results to deteriorate a signal-to-noise ratio of the driving signal.

Further, in the oscillation circuit 10 shown in FIG. 5, an electrostatic capacity between the drain and the source of the FET 16 changes according to the change of the impedance between the drain and the source of the FET 16 as the variable impedance element of the automatic gain control circuit 13. Consequently, a phase difference is produced between the input signal and the output signal of the automatic gain control circuit 13, and it changes in response to the change of the gain of the automatic gain control circuit 13.

In other words, the changes of states of circuit elements in the oscillation circuit 10 shown in FIG.5 affects the stability of oscillation, and so the driving signal applied to the piezoelectric elements 3a and 3b of the vibrator 1 fluctuates. This results in the fact that the signal detected from the piezoelectric elements 3a and 3b of the vibrator 1 is not stabilized and so the detection sensitivity of the rotational angular velocity is not stabilized either in the vibrating gyroscope wherein the vibrator 1 which is driven by the driving signal of the oscillation circuit 10 is employed.

SUMMARY OF THE INVENTION

The object of the present invention is to provide an oscillation circuit which generates a driving signal for driving a vibrator by utilizing a signal detected from the vibrator itself and can stabilize the detected signal in order to solve the above stated problems.

The oscillation circuit related to the present invention comprises (1) a comparator which receives the signal detected from the vibrator and shapes the detected signal to a square-wave signal with a constant amplitude, (2) a control signal generator which receives the signal detected from the vibrator and compares it with a reference voltage to generate a control signal based on the difference between the detected signal and the reference voltage, (3) a transistor whose collector receives the square-wave signal obtained from the comparator and whose base receives the control signal obtained from the control signal generator, and (4) a phase-shifting circuit whose input terminal is connected to the emitter of the transistor; wherein the output of the phase-shifting circuit is used as the driving signal for driving the vibrator. Moreover, the signal detected from the vibrator can contain several detected signals and they can be added by an adder and applied to the comparator and the control signal generator in the oscillation circuit related to the present invention.

The comparator shapes the signal detected from the vibrator to a square-wave signal with a constant amplitude. The control signal generator compares the reference voltage with the signal detected from the vibrator and generates a control signal based on the difference between the detected signal and the reference voltage. The square-wave signal obtained from the comparator is applied to the collector of the transistor and the control signal obtained from the control signal generator is applied to the base of the transistor. Thus, the amplitude of the square-wave signal is adjusted by the transistor with reference to the control signal. In this case, when the amplitude of the signal detected from the vibrator is great, the amplitude of the square-wave signal is adjusted to become smaller; in reverse to this, when the amplitude the signal detected from the vibrator is small, the amplitude of the square-wave signal is adjusted to become greater. Then, the amplitude-adjusted square-wave signal is phase-compensated by the phase-shifting circuit so that it may keep stable the oscillation loop and then it is used as the driving signal for driving the vibrator.

As stated above, the oscillation circuit related to the present invention generates the driving signal for driving the vibrator by utilizing the signal detected from the vibrator itself. The amplitude of the driving signal is adjusted based on the signal detected from the vibrator by the transistor whose reactance changes little. The phase of the driving signal is compensated by the phase-shifting circuit. Therefore, the signal detected from the vibrator is stabilized.

The present invention realizes an oscillation circuit which generates a driving signal for driving a vibrator by utilizing the signal detected from the vibrator and stabilizes the detected signal. In this way, the signal detected from the vibrator is stabilized and a sensitivity to detect a rotational angular velocity is also stabilized in a vibrating gyroscope related to the present invention for which the vibrator that is driven by the driving signal of the oscillation circuit is used.

The above and other objects, features, aspects and advantages of the present invention will become more apparent from the following detailed description of the embodiment made with reference to the drawings.

DESCRIPTION OF THE PREFERRED EMBODIMENTS

Figure 1:
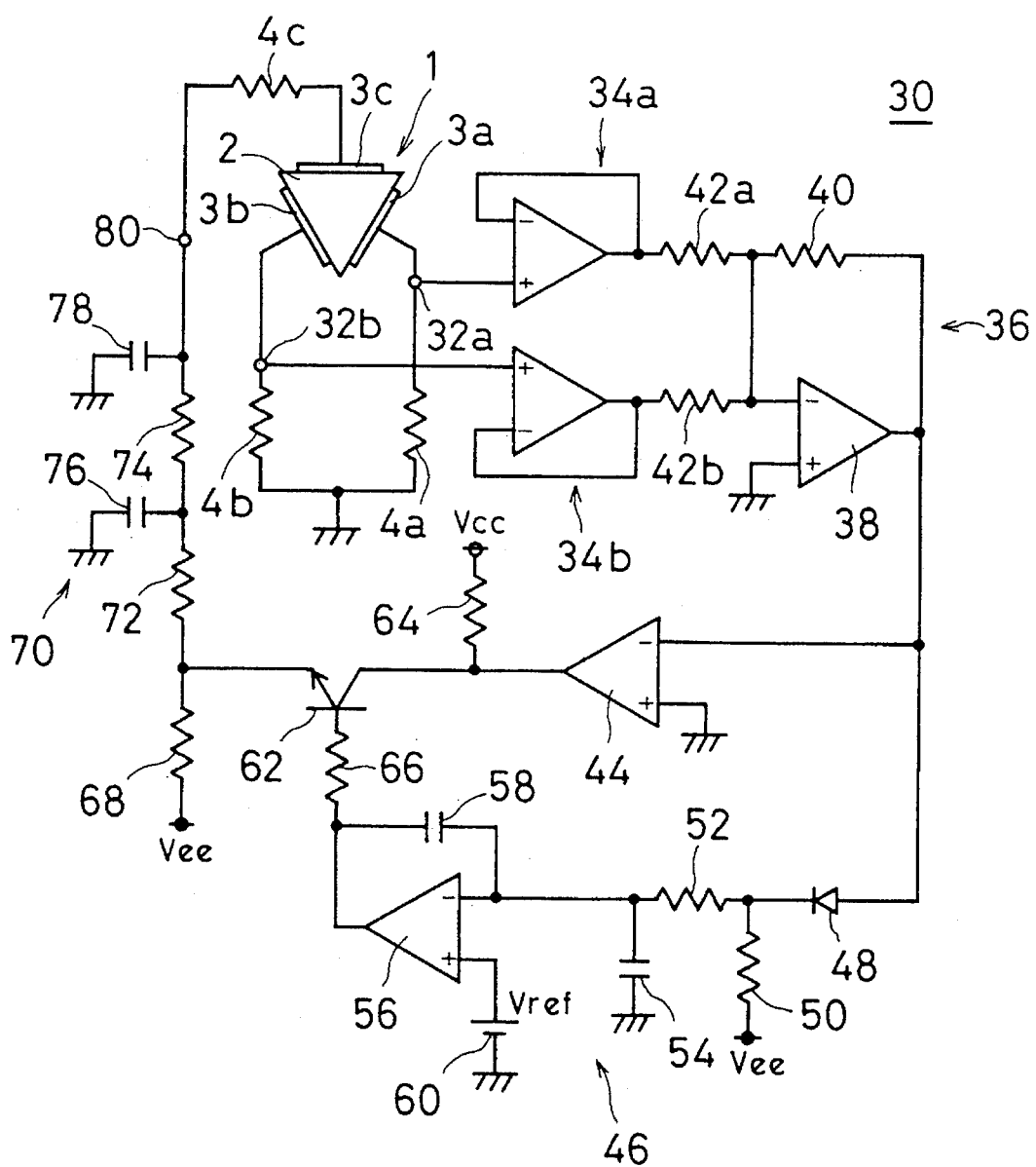
FIG. 1 is a circuit diagram showing one embodiment of the present invention.

FIG. 1 is a circuit diagram showing one embodiment of the present invention. The oscillation circuit 30 contains two input terminals 32a and 32b. The input terminals 32a and 32b are provided to apply a signal detected from a vibrator and, for example, are connected to piezoelectric elements 3a and 3b of the vibrator 1 shown in FIG. 1. The piezoelectric elements 3a and 3b are grounded via resistors 4a and 4b. In this case, let C be an electrostatic capacity of each of the piezoelectric elements 3a and 3b and f be a resonance frequency of the vibrator 1, it is desirable to set a resistance value of each of the resistors 4a and 4b to $1/(2\pi fC)$.

The input terminals 32a and 32b are connected to buffers 34a and 34b each of which consists of an operational amplifier. The buffers 34a and 34b convert an impedance of the signals detected from the piezoelectric elements 3a and 3b of the vibrator 1 to much smaller value.

Output terminals of the two buffers 34a and 34b are connected to two input terminals of an adder 36. The adder 36 contains an operational amplifier 38. A non-inversion input terminal of the operational amplifier 38 is grounded. A resistor 40 is connected between an inversion input terminal and an output terminal of the operational amplifier 38. The output terminals of the buffers 34a and 34b are connected to the inversion input terminal of the operational amplifier 38 via resistors 42a and 42b, respectively. The adder 36 is provided to invert and add output signals of the buffers 34a and 34b, which are the signals detected from the piezoelectric elements 3a and 3b of the vibrator 1.

An output terminal of the adder 36 is connected to an inversion input terminal of an operational amplifier 44 used as a comparator. A non-inversion input terminal of the operational amplifier 44 is grounded. The operational amplifier 44 is provided to invert an output signal of the adder 36 and shape it to a square-wave signal with a constant amplitude.

Figure 2:
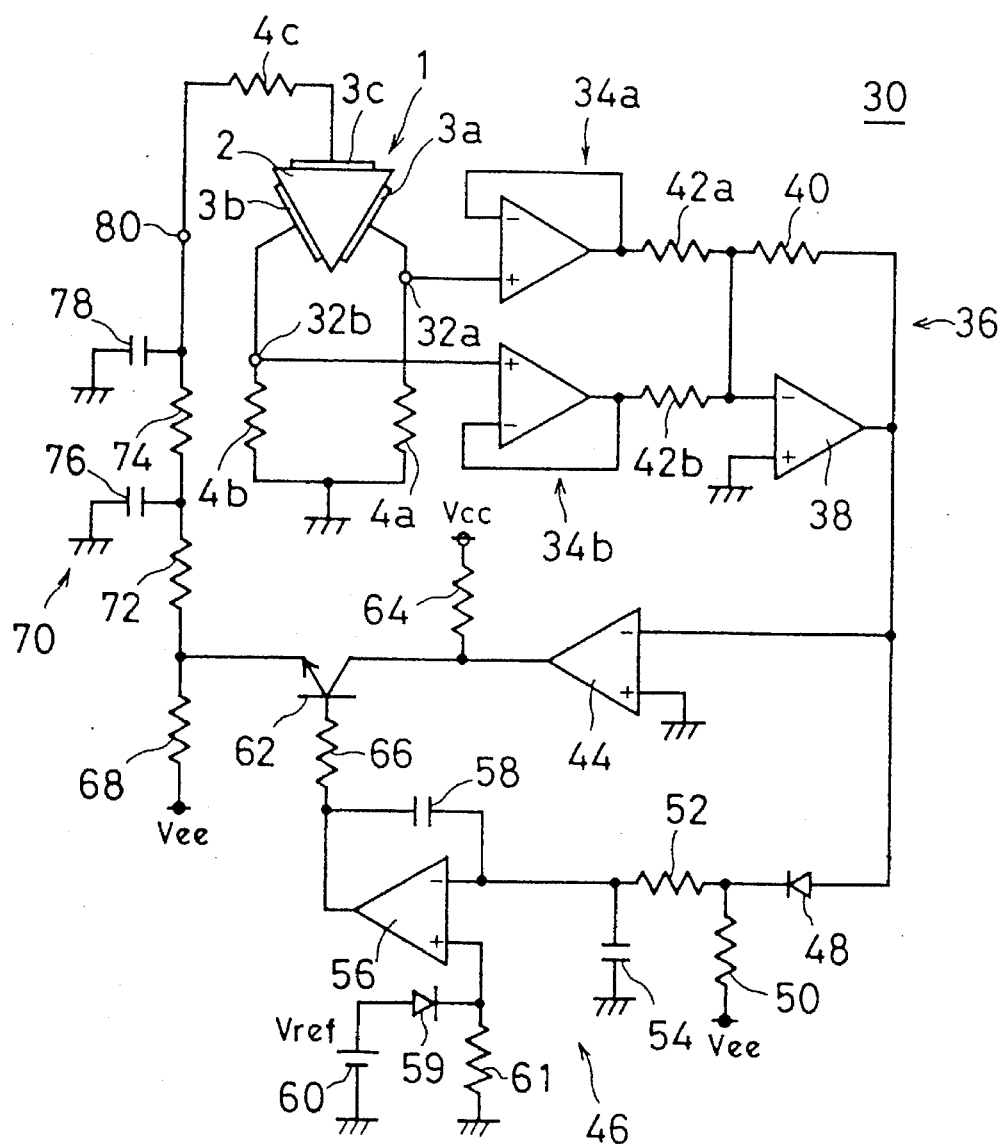
FIG. 2 is a circuit diagram showing a variation of the embodiment shown in FIG. 1.

The output terminal of the adder 36 is connected to an input terminal of a control signal generator 46. The control signal generator 46 contains a diode 48 whose anode is connected to the output terminal of the adder 36. A cathode of the diode 48 is connected to a negative-voltage power supply $V_{ee}$ and grounded via a resistor 52 and a capacitor 54. Thus, a rectifier circuit is made with the diode 48, the resistors 50 and 52, and the capacitor 54. A connecting point of the resistor 52 and capacitor 54 is connected to an inversion input terminal of an operational amplifier 56. A capacitor 58 is connected between the inversion input terminal and an output terminal of the operational amplifier 56, and a reference power supply 60 is connected to the non-inversion input terminal of the operational amplifier 56 to apply a reference voltage $V_{ref}$ to it. In this way, a closed loop circuit is composed from the operational amplifier 56, the capacitor 58, and the reference power supply 60. The closed loop circuit performs based on a difference between the reference voltage $V_{ref}$ and an output of the rectifier circuit. The control signal generator 46 consisting of the rectifier circuit and the closed loop circuit is provided to generate a control signal for controlling a transistor 62 described later based on a difference between the reference voltage $V_{ref}$ and an amplitude of the output signal of the adder 36. A diode can be connected in series to the reference power supply 60 to compensate for temperature characteristics of the forward voltage drop in the diode 48 used in the rectifier circuit. In this case, for example, it is recommendable to (1) connect a cathode of a diode 59 to the non-inversion input terminal of the operational amplifier 56, (2) apply the reference voltage $V_{ref}$ of the reference power supply 60 to an anode of the diode 59, and (3) ground the non-inversion input terminal of the operational amplifier 56 via a resistor 61 as shown in FIG. 2.

An output terminal of the operational amplifier 44 used as the above mentioned comparator is connected to a collector of a transistor 62. A positive-voltage power supply $V_{cc}$ is connected to the collector of the transistor 62 via a resistor 64. An output terminal of the control signal generator 46 (an output terminal of the operational amplifier 56) is connected to a base of the transistor 62 via a resistor 66. The transistor 62 is provided to adjust an amplitude of a square-wave signal sent from the operational amplifier 44 based on the control signal supplied from the control signal generator 46.

An emitter of the transistor 62 is connected to the negative-voltage power supply $V_{ee}$ via a resistor 68 and also connected to an input terminal of a phase-shifting circuit 70. The phase-shifting circuit 70 consists of two RC networks comprising two resistors 72 and 74 and two capacitors 76 and 78, and compensates a phase of the square-wave signal obtained from the emitter of the transistor 62 so that it may be the best phase for driving the vibrator 1.

An output terminal of the phase-shifting circuit 70 is connected to an output terminal 80. The output terminal 80 of the oscillation circuit 30 is connected to the piezoelectric element 3c of the vibrator 1 via a resistor 4c.

The oscillation circuit 30, by means of the buffers 34a and 34b, converts the impedance of the signals detected from the piezoelectric elements 3a and 3b of the vibrator 1 to smaller values, and the detected signals are inverted and added by the adder 36.

The output signal of the adder 36 is inverted by the operational amplifier 44 used as a comparator and shaped to the square-wave signal with the constant amplitude. The square-wave signal is supplied to the collector of the transistor 62.

The control signal generator 46 compares the reference voltage $V_{ref}$ with the amplitude of the output from the adder 36 and then generates the control signal based on the difference. In this case, in the control signal generator 46, the output signal of the adder 36 is rectified by the rectifier circuit consisting of the diode 48 and others, the differential signal between the reference voltage $V_{ref}$ and the output signal from the rectifier circuit is detects by the closed loop circuit whose major component is the operational amplifier 56, and then the control signal is obtained. The control signal is supplied to the base of the transistor 62 . The control signal thus obtained automatically varies so that a level of the signal rectified by the diode 48 may become the same as the reference voltage $V_{ref}$. In this way, the output of the adder 36, that is the sum of the outputs of the piezoelectric elements 3a and 3b, is kept at a constant level at all time.

Consequently, the amplitude of the above stated square-wave signal is adjusted by the transistor 62 based on the control signal. When the amplitudes of the signals detected from the piezoelectric elements 3a and 3b of the vibrator 1 are great, the voltage level of the control signal is lowered and the amplitude of the square-wave signal is adjusted to be smaller. In reverse to this, when the amplitudes of the above detected signals are small, the voltage level of the control signal is heightened and the amplitude of the square-wave signal is adjusted to be greater.

The square-wave signal whose amplitude is adjusted is compensated by the phase-shifting circuit 70 so that its phase may be the best to drive the vibrator 1; the square-wave signal as the driving signal is applied to the piezoelectric element 3c of the vibrator 1. The phase of the square-wave signal is controlled by the phase-shifting circuit 70 so that the oscillation is kept to continue and its waveform is conditioned to a certain shape.

As stated above, the oscillation circuit 30, by utilizing the signals detected from the piezoelectric elements 3a and 3b of the vibrator 1, generates the driving signal for driving the vibrator 1. The amplitude of the driving signal is adjusted by the transistor 62 whose reactance changes little based on the signals detected from the piezoelectric elements 3a and 3b of the vibrator 1 and its phase is compensated by the phase-shifting circuit 70. Thus, the signals detected from the piezoelectric elements 3a and 3b of the vibrator 1 are stabilized. Consequently, the signals detected from the piezoelectric elements 3a and 3b of the vibrator 1 are stabilized and the sensitivity to detect the rotational angular velocity is also stabilized in the vibrating gyroscope wherein the vibrator 1 which is driven by the driving signal generated by the oscillation circuit 30 is used.

As stated above,the oscillation stability is kept satisfactorily because the waveform and the phase of the driving signal generated are well controlled in the oscillation circuit 30. This results, the stability of the sensitivity for detecting the rotational angular velocity is improved in the vibrating gyroscope wherein the vibrator is driven by the driving signal which originates in the vibrator itself.

In this oscillation circuit 30, the amplitude of the driving signal generated originally in the vibrator is determined by a base potential of the transistor 62 and can be varied in a wide range because it is restricted only by the amplitude of the output signal of the comparator 44, the amplitude of the output signal of the control signal generator 46, and a voltage applied across the base and emitter of the transistor 62. Consequently, a variation of the sensitivity for detecting the output signal of the vibrator 1 can be compensated widely.

Figure 5:
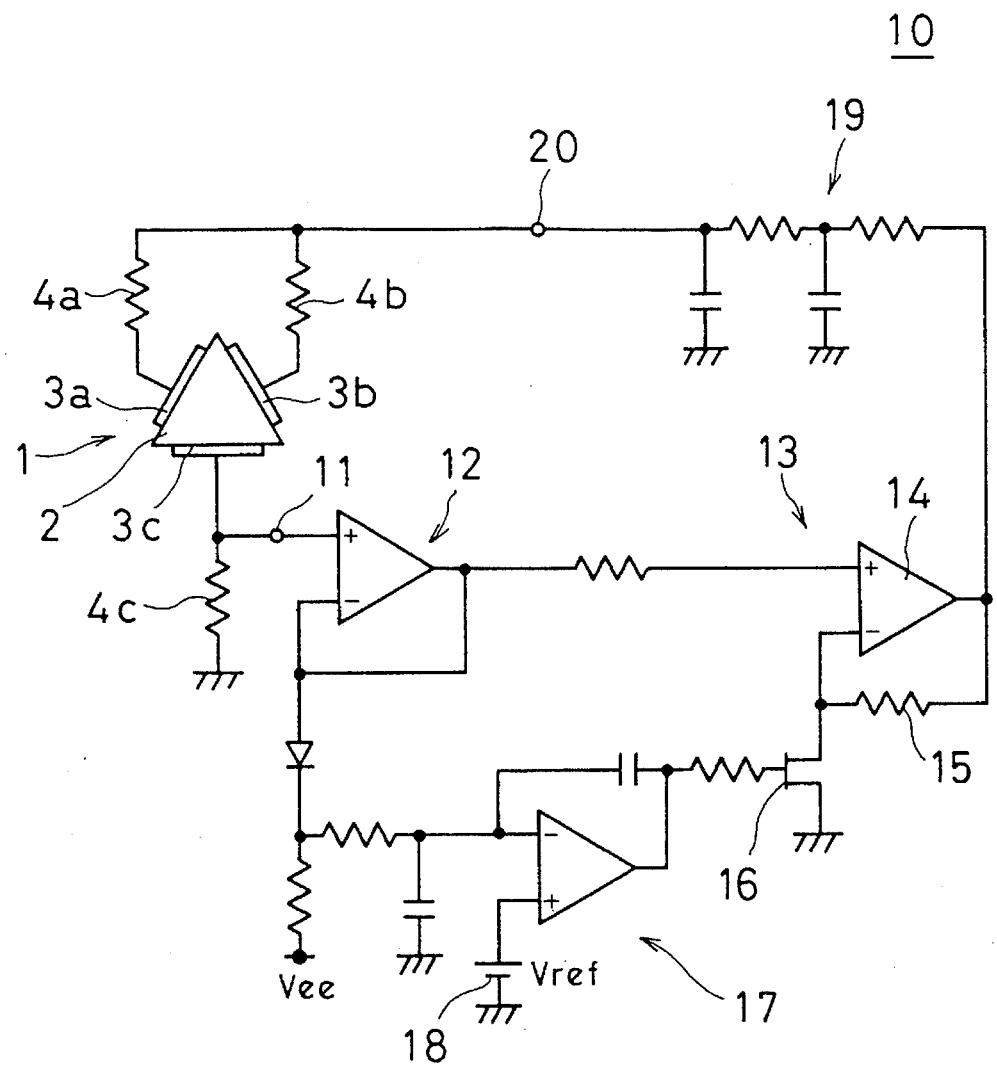
FIG. 5 is a circuit diagram showing the conventional oscillation circuit for applying a driving signal to the vibrator shown in FIG. 4.

The detection sensitivity of the rotational angular velocity can be greatly improved in the embodiment shown in FIG. 1 over the conventional circuit shown in FIG. 5. The reason for this is that, in the conventional circuit shown in FIG. 5, the piezoelectric elements 3a and 3b for detecting the rotational angular velocity are different from the piezoelectric element 3c for detecting the amplitude but, in the embodiment of the present invention, the same piezoelectric elements 3a and 3b are used for detecting the rotational angular velocity and amplitude.

In other words, in the prior art shown in FIG. 5, the piezoelectric elements 3a, 3b, and 3c disagree (as caused by the manufacturing process) the characteristic of sensitivity with the characteristic of amplitude; therefore the object of achieving a stable sensitivity may not be attained, and, the signal generated by the rotational angular velocity may cause an error.

Contrary to the above, in the embodiment of the present invention shown in FIG. 1, the same piezoelectric elements 3a and 3b are used for detecting the rotational angular velocity and the amplitude. The signals, corresponding to the rotational angular velocity, generated in the piezoelectric elements 3a and 3b are the same in magnitude and in reverse polarities; therefore they can be canceled by taking their sum. Consequently, the sensitivity for detecting the rotational angular velocity can be stabilized more easily in the embodiment of the present invention shown in FIG. 1 than in the prior art shown in FIG. 5.

The magnitudes of the control signal and the driving signal can be varied by changing the reference voltage $V_{ref}$ of the reference power supply in the oscillation circuit 30; therefore the magnitude of the signal detected from the vibrator 1 and the sensitivity for detecting the rotational angular velocity of the vibrating gyroscope can be controlled.

Figure 3:
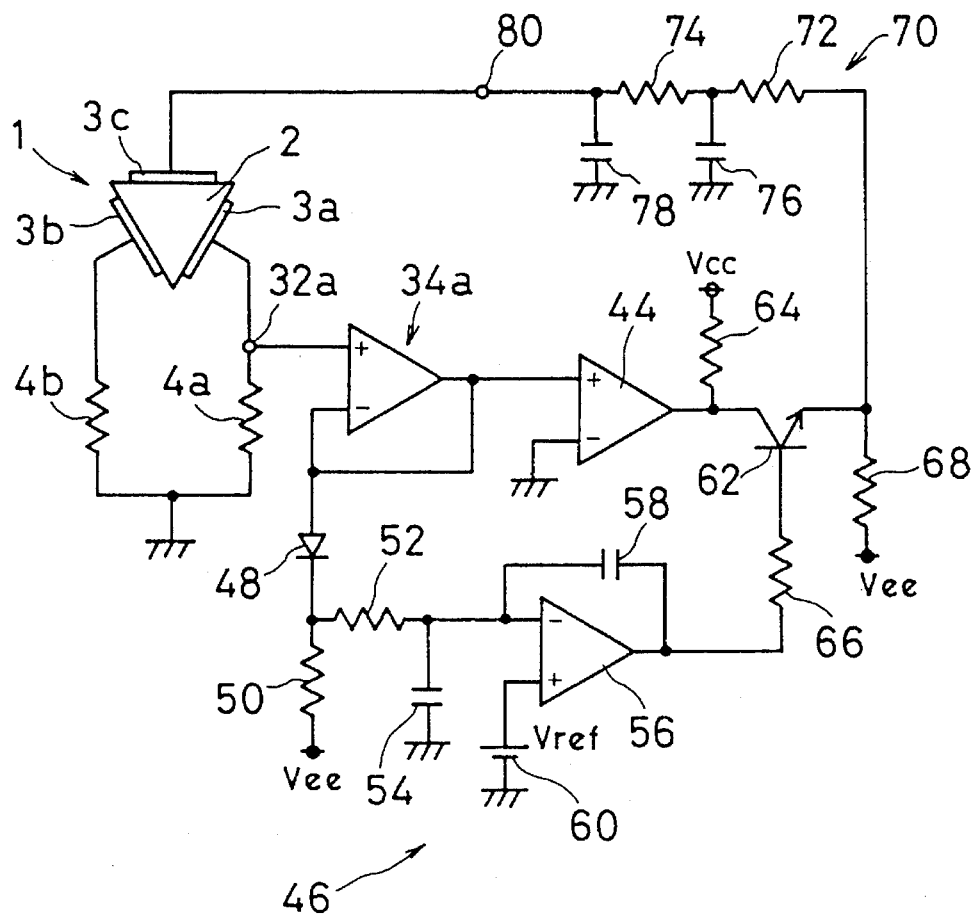
FIG. 3 is a circuit diagram showing another embodiment of the present invention.
Figure 4:
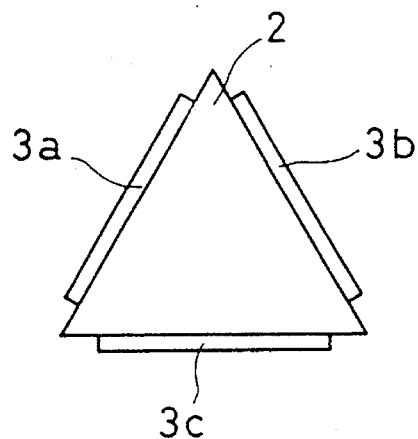
FIG. 4 is a illustration view showing an example of a conventional vibrator used for a vibrating gyroscope which is a background of the present invention.

FIG. 3 is a circuit diagram showing another embodiment of the present invention. In the embodiment shown in FIG. 3, the input terminal 32b, the buffer 34b, and the adder 36 which are used in the embodiment shown in FIG. 1 are not used. Thus, in the embodiment shown in FIG. 3, the output terminal of the buffer 34a is connected to the non-inversion input terminal of the operational amplifier 44 used as a comparator and also connected to the anode of the diode 48 of the control signal generator 46. The inversion input terminal of the operational amplifier 44 used as the comparator is grounded.

In the embodiment shown in FIG. 3, the driving signal for driving the vibrator 1 is generated by utilizing the signal detected from the piezoelectric element 3a of the vibrator 1. In the embodiment shown in FIG. 3, the same operation is performed as in the embodiment shown in FIG. 1 and the same effect can be achieved. In the embodiment shown in FIG. 3, the adder 36, which is used in the embodiment shown in FIG. 1, for inverting the signal is not placed preceding the operational amplifier 44 used as the comparator; therefore the operational amplifier 44 does not invert the signal.

In the above embodiments, the buffer can be replaced by a non-inversion amplifier.

In the above embodiments, the rectifier circuit consisting of the diode 48, the resistors 50 and 52, and the capacitor 54 can be replaced with an operational amplifier. While the present invention has been particularly described and shown, it is to be understood that such description is used merely as an illustration and an example rather than limitation, and the spirit and scope of the present invention is determined solely by the terms of the appended claims.

What is claimed is:

1. An oscillation circuit comprising:

a comparator which receives a signal detected from a vibrator and shapes it to a square-wave signal with a constant amplitude, a control signal generator which receives the detected signal from said vibrator, compares it with a reference voltage, and generates a control signal based on a difference between the reference voltage and the control signal, a transistor whose collector receives the square-wave signal from said comparator and whose base receives the control signal from said control signal generator, and a phase-shifting circuit whose input terminal is connected to an emitter of said transistor;

wherein an output signal of said phase-shifting circuit is used for driving said vibrator.

2. An oscillation circuit in accordance with claim 1, wherein the signal detected from said vibrator contains several detected signals which are added and applied to said comparator and said control signal generator.

3. An oscillation circuit in accordance with claim 1, receiving the signal detected from said vibrator, having a buffer which converts an impedance of the detected signal, and said buffer is connected between said comparator and said control signal generator, and said vibrator.

4. An oscillation circuit in accordance with claim 1, wherein said control signal generator comprising:

an operational amplifier, a reference voltage power supply for applying a reference voltage to a non-inversion input terminal of said operational amplifier, a rectifier circuit which rectifies a signal detected from said vibrator and applies the rectified signal to an inversion input terminal of said operational amplifier, and a capacitor connected between an output terminal and the inversion input terminal of said operational amplifier.

5. An oscillation circuit in accordance with claim 2, receiving the signal detected from said vibrator, having a buffer which converts the impedance of the detected signal, and said buffer is connected between said vibrator and said adder.

6. An oscillation circuit in accordance with claim 2, wherein said control signal generator comprising:

an operational amplifier, a reference voltage power supply for applying the reference voltage to a non-inversion input terminal of said operational amplifier, a rectifier circuit which rectifies a signal obtained from said adder and applies it to an inversion input terminal of said operational amplifier, and a capacitor connected between an output terminal and inversion input terminal of said operational amplifier.

7. An oscillation circuit in accordance with claim 3, wherein said control signal generator comprising:

an operational amplifier, a reference voltage power supply for applying the reference voltage to a non-inversion input terminal of said operational amplifier, a rectifier circuit which rectifies a signal obtained from said buffer and applies it to an inversion input terminal of said operational amplifier, and a capacitor connected between an output terminal and the inversion input terminal of said operational amplifier.

8. An oscillation circuit in accordance with claim 4, wherein said control signal generator comprising:

a first diode in said rectifier circuit and a second diode connected between said reference voltage power supply and the non-inversion input terminal of said operational amplifier to compensate for the temperature characteristic of a forward voltage drop of said first diode.

9. An oscillation circuit in accordance with claim 5, wherein said control signal generator comprising:

an operational amplifier, a reference voltage power supply for applying the reference voltage to a non-inversion input terminal of said operational amplifier, a rectifier circuit which rectifies a signal obtained from said adder and applies it to an inversion input terminal of said operational amplifier, and a capacitor connected between an output terminal and the inversion input terminal of said operational amplifier.

10. An oscillation circuit in accordance with claim 6, wherein said control signal generator comprising:

a first diode in said rectifier circuit and a second diode connected between said reference voltage power supply and a non-inversion input terminal of said operational amplifier to compensate for the temperature characteristic of a forward voltage drop of said first diode.

11. An oscillation circuit in accordance with claim 7, wherein said control signal generator comprising:

a first diode in said rectifier circuit and a second diode connected between said reference voltage power supply and a non-inversion input terminal of said operational amplifier to compensate for the temperature characteristic of a forward voltage drop of said first diode.

12. An oscillation circuit in accordance with claim 9, wherein said control signal generator comprising:

a first diode in said rectifier circuit and a second diode connected between said reference voltage power supply and a non-inversion input terminal of said operational amplifier to compensate for the temperature characteristic of a forward voltage drop of said first diode.

* * * * *